(12) United States Patent
Shibata

(10) Patent No.: US 9,020,064 B2
(45) Date of Patent: Apr. 28, 2015

(54) MULTILEVEL SIGNAL TRANSMISSION SYSTEM CAPABLE OF ACCURATELY DETERMINING VOLTAGE LEVELS OF TRANSMITTED MULTILEVEL DATA SIGNAL

(71) Applicant: Panasonic Intellectual Property Management Co., Ltd., Osaka (JP)

(72) Inventor: Osamu Shibata, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/499,503

(22) Filed: Sep. 29, 2014

(65) Prior Publication Data

US 2015/0016562 A1    Jan. 15, 2015

Related U.S. Application Data

(63) Continuation of application No. PCT/JP2013/001748, filed on Mar. 14, 2013.

(30) Foreign Application Priority Data

Apr. 19, 2012 (JP) .................................. 2012-095886

(51) Int. Cl.
*H04L 25/34* (2006.01)
*H04L 25/00* (2006.01)
(Continued)

(52) U.S. Cl.
CPC .......... *H04L 1/0033* (2013.01); *H04L 25/4917* (2013.01)

(58) Field of Classification Search
CPC ............ H04L 25/0272; H04L 25/0292; H04L 25/028; H04L 25/08; H04L 7/0008; H04L 25/4917; H04L 25/4925; H04L 25/4919; H04L 25/4923; H04L 25/062; H04L 25/061; H04L 27/08
USPC .................. 375/257, 286, 287, 295, 316, 340
See application file for complete search history.

(56) References Cited

U.S. PATENT DOCUMENTS

| 7,042,965 B2 | 5/2006 | Katta et al. |
| 2004/0013214 A1 | 1/2004 | Katta et al. |

(Continued)

FOREIGN PATENT DOCUMENTS

| JP | 61-133718 | 6/1986 |
| JP | 2000-244586 | 9/2000 |

(Continued)

OTHER PUBLICATIONS

International Preliminary Report on Patentability and Written Opinion of the International Searching Authority mailed on Nov. 27, 2014 in International (PCT) Patent Application No. PCT/JP2013/001748.

(Continued)

*Primary Examiner* — Tesfaldet Bocure
(74) *Attorney, Agent, or Firm* — Wenderoth, Lind & Ponack, L.L.P.

(57) ABSTRACT

A multilevel signal transmitting apparatus transmits a multilevel data signal with M voltage levels, and a multilevel clock signal with (M−2) voltage levels, to a multilevel signal receiving apparatus, where M is an even number equal to or more than four. The voltage levels of the multilevel data signal include M/2 first voltage levels larger than a reference voltage level, and M/2 second voltage levels smaller than the reference voltage level. Between each pair of adjacent voltage levels among the first voltage levels, one voltage level of the multilevel clock signal is set. Between each pair of adjacent voltage levels among the second voltage levels, one voltage level of the multilevel clock signal is set. An average of the voltage levels of the multilevel clock signal has a value between a minimum of the first voltage levels, and a maximum of the second voltage levels.

17 Claims, 12 Drawing Sheets

(51) Int. Cl.
*H04L 1/00* (2006.01)
*H04L 25/49* (2006.01)

(56) References Cited

U.S. PATENT DOCUMENTS

2005/0147178 A1* 7/2005 Kikuchi ................ 375/288
2008/0246755 A1* 10/2008 Lee ...................... 345/214
2010/0225620 A1* 9/2010 Lee ...................... 345/204

FOREIGN PATENT DOCUMENTS

JP  2004-080827  3/2004
JP  2007-081808  3/2007

OTHER PUBLICATIONS

International Search Report issued May 7, 2013 in International (PCT) Application No. PCT/JP2013/001748 with English translation.

* cited by examiner

MULTILEVEL SIGNAL TRANSMISSION SYSTEM CAPABLE OF ACCURATELY DETERMINING VOLTAGE LEVELS OF TRANSMITTED MULTILEVEL DATA SIGNAL

CROSS-REFERENCE TO RELATED APPLICATIONS

This is a continuation application of International Application No. PCT/JP2013/001748, with an international filing date of Mar. 14, 2013, which claims priority of Japanese Patent Application No. 2012-095886 filed on Apr. 19, 2012, the content of which is incorporated herein by reference.

BACKGROUND

1. Technical Field

The present disclosure relates to a multilevel signal transmitting apparatus, a multilevel signal receiving apparatus, and a multilevel signal transmission system, for transmitting multilevel data signals with a plurality of voltage levels equal to or more than four. The present disclosure also relates to a multilevel signal transmission method using such a multilevel signal transmitting apparatus and a multilevel signal receiving apparatus.

2. Description of Related Art

In recent years, as the video quality of digital contents improves, the bit rate and size of video data increase, and as a result, the data amount to be transmitted between apparatuses also increases. In order to transmit a large amount of data between apparatuses connected through a digital interface, a frequency of signal transmission is often increased. However, if the frequency is increased, the signal transmission becomes difficult due to attenuation in a transmission line. In order to avoid this problem, there is the multilevel signal transmission scheme in which data is multiplexed by transmitting a multilevel data signal with a plurality of voltage levels equal to or more than three, without increasing a frequency of signal transmission.

For example, the invention of Japanese Patent laid-open Publication No. S61-133718 A is known as an example of a circuit using a multilevel signal, and the invention of Japanese Patent laid-open Publication No. 2004-080827 A is known as an example of a transmission system using a multilevel signal.

SUMMARY

According to a conventional multilevel signal transmission system, a receiving apparatus has a plurality of predetermined threshold voltages for determining which of a plurality of voltage levels is indicated by a multilevel data signal received from a transmitting apparatus. However, in general, as the number of voltage levels of a multilevel data signal increases, it becomes difficult to determine which of the voltage levels is indicated by a received multilevel data signal. In particular, a voltage level and a reference of a transmitted multilevel data signal may vary due to: a difference between threshold voltages used by the transmitting apparatus and threshold voltages used by the receiving apparatus, a difference between a ground voltage of the transmitting apparatus and a ground voltage of the receiving apparatus, a voltage variation arose from a temperature change, etc., a voltage variation arose from a device variation, a voltage variation arose from attenuation in a transmission line, etc. Therefore, there is a problem that the receiving apparatus can not correctly determine the voltage level of the received multilevel data signal.

The object of the present disclosure is to solve the above problems, and to provide a multilevel signal transmitting apparatus, a multilevel signal receiving apparatus, a multilevel signal transmission system, and a multilevel signal transmission method, each capable of accurately determining a plurality of voltage levels of a multilevel data signal.

According to a multilevel signal transmitting apparatus according to one general aspect of the present disclosure, a multilevel signal transmitting apparatus is provided with: a first driver circuit configured to generate a multilevel data signal with a number M of voltage levels, and a second driver circuit configured to generate a multilevel clock signal with a number (M−2) of voltage levels, where M is an even number equal to or more than four. The number M of voltage levels of the multilevel data signal include a number M/2 of first voltage levels larger than a predetermined reference voltage level, and a number M/2 of second voltage levels smaller than the reference voltage level. Between each pair of adjacent voltage levels selected among the number M/2 of first voltage levels of the multilevel data signal, one of the number (M−2) of voltage levels of the multilevel clock signal is set. Between each pair of adjacent voltage levels selected among the number M/2 of second voltage levels of the multilevel data signal, one of the number (M−2) of voltage levels of the multilevel clock signal is set. An average of the voltage levels of the multilevel clock signal for a predetermined time has a value between a minimum of the number M/2 of first voltage levels of the multilevel data signal, and a maximum of the number M/2 of second voltage levels of the multilevel data signal.

According to a multilevel signal receiving apparatus according to another general aspect of the present disclosure, a multilevel signal receiving apparatus is provided with: a first receiver circuit configured to receive a multilevel data signal with a number M of voltage levels, and a second receiver circuit configured to receive a multilevel clock signal with a number (M−2) of voltage levels, where M is an even number equal to or more than four. The number M of voltage levels of the multilevel data signal include a number M/2 of first voltage levels larger than a predetermined reference voltage level, and a number M/2 of second voltage levels smaller than the reference voltage level. Between each pair of adjacent voltage levels selected among the number M/2 of first voltage levels of the multilevel data signal, one of the number (M−2) of voltage levels of the multilevel clock signal is set. Between each pair of adjacent voltage levels selected among the number M/2 of second voltage levels of the multilevel data signal, one of the number (M−2) of voltage levels of the multilevel clock signal is set. An average of the voltage levels of the multilevel clock signal for a predetermined time has a value between a minimum of the number M/2 of first voltage levels of the multilevel data signal, and a maximum of the number M/2 of second voltage levels of the multilevel data signal. The multilevel signal receiving apparatus is further provided with a threshold voltage detector circuit configured to detect the number (M−2) of voltage levels of the multilevel clock signal and an average of the voltage levels of the multilevel clock signal, as a number (M−1) of threshold voltages, from the received multilevel clock signal. The first receiver circuit configured to determine, based on the number (M−1) of threshold voltages, which of the number M of voltage levels is indicated by the received multilevel data signal.

In addition, according to other aspects of the present disclosure, a multilevel signal transmission system provided with the multilevel signal transmitting apparatus and the multilevel signal receiving apparatus, and a multilevel signal transmission method are provided.

The general and specific aspects may be implemented using a system, a method, and a computer program, and any combination of systems, methods, and computer programs.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

There is no conventional solution to determine a plurality of voltage levels of a multilevel data signal, by generating and using a multilevel clock signal. According to the multilevel signal transmitting apparatus, the multilevel signal receiving apparatus, the multilevel signal transmission system, and the multilevel signal transmission method of the aspects of the present disclosure, it is possible to accurately determine a plurality of voltage levels of a multilevel data signal.

DETAILED DESCRIPTION

Figure 1:
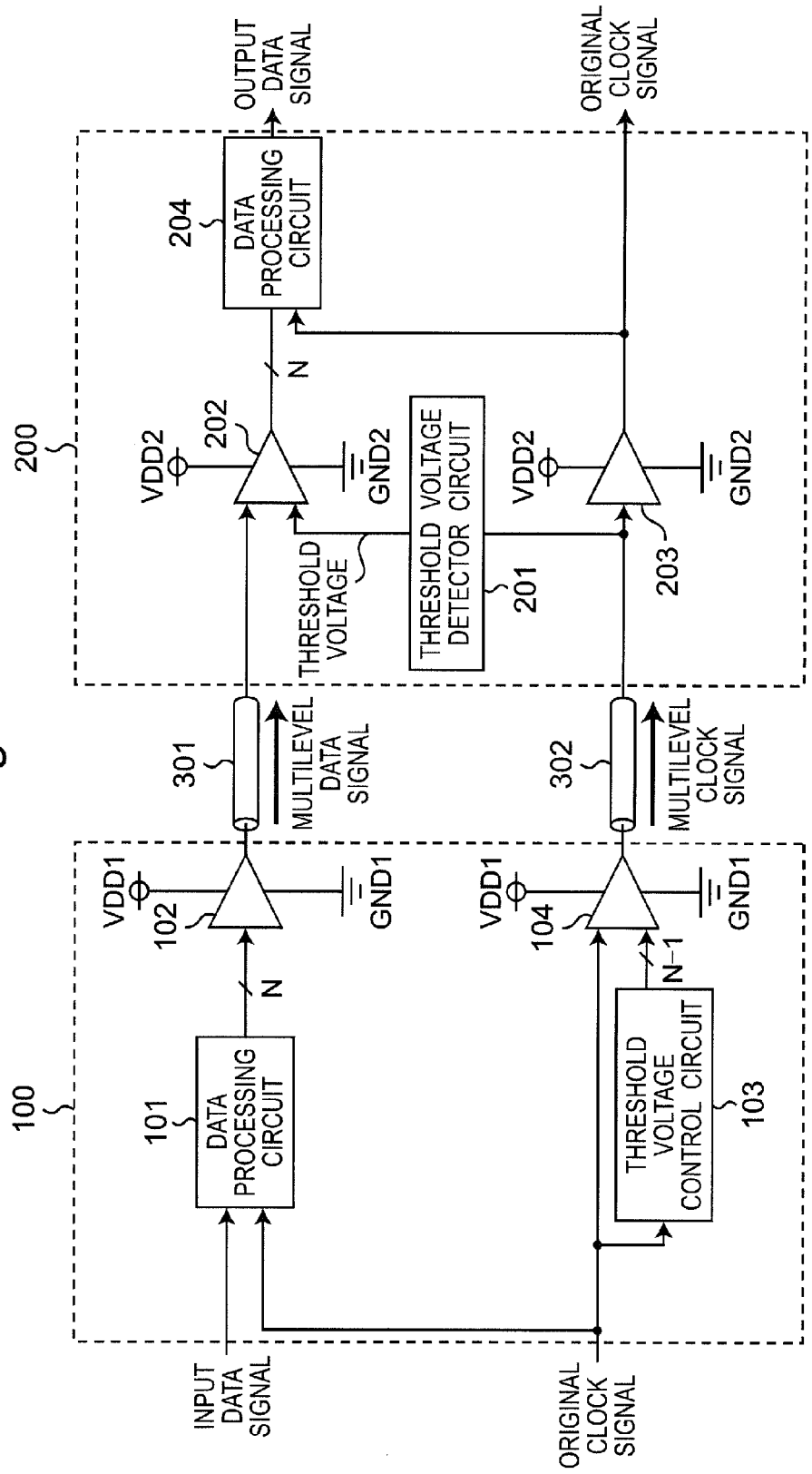
FIG. 1 is a block diagram showing a configuration of a multilevel signal transmission system according to a first embodiment.

Embodiments of the present disclosure will be described hereinafter with reference to the drawings.

In the drawings, the same reference sign indicates similar components.

First Embodiment

FIG. 1 is a block diagram showing a configuration of a multilevel signal transmission system according to a first embodiment. the multilevel signal transmission system of FIG. 1 is provided with a multilevel signal transmitting apparatus 100 and a multilevel signal receiving apparatus 200, transmits a multilevel data signal with a number M of voltage levels from the multilevel signal transmitting apparatus 100 to the multilevel signal receiving apparatus 200 through a transmission line 301, and transmits a multilevel clock signal with a number (M−2) of voltage levels from the multilevel signal transmitting apparatus 100 to the multilevel signal receiving apparatus 200 through a transmission line 302, where M is an even number equal to or more than four. In respective embodiments described in this specification, the number M is a power of two (for example, four or eight, etc.), it is expressed in N bits. The multilevel signal transmission system of FIG. 1 can accurately determine the plurality of voltage levels of the multilevel data signal by using the multilevel clock signal.

An input data signal and an original clock signal at a certain frequency f [Hz] are inputted into the multilevel signal transmitting apparatus 100 from an external circuit (not shown). The multilevel signal transmitting apparatus 100 is provided with a data processing circuit 101, a first multilevel driver circuit 102, a threshold voltage control circuit 103, and a second multilevel driver circuit 104. In addition, the multilevel signal transmitting apparatus 100 has a power supply VDD1 and a ground GND1.

The data processing circuit 101 operates based on the original clock signal, generates Nbit parallel data from the input data signal, and sends it to the multilevel driver circuit 102. The multilevel driver circuit 102 generates the multilevel data signal at one of $2^N$ voltage levels, from the Nbit parallel data indicative of the input data signal. The $2^N$ voltage levels of the multilevel data signal includes $2^{N-1}$ first voltage levels larger than a predetermined reference voltage level (e.g., a center level given as a voltage level between a voltage of the power supply VDD1 and a voltage of grounding GND1), and $2^{N-1}$ second voltage levels smaller than the reference voltage level.

The threshold voltage control circuit 103 operates based on the original clock signal, and controls the multilevel driver circuit 104 to generate the multilevel clock signal at one of $(2^{N-1}-1) \times 2$ voltage levels. The respective voltage levels of the multilevel clock signal correspond to $2^N - 2$ threshold voltages of $2^N - 1$ threshold voltages for determining the $2^N$ voltage levels of the multilevel data signal. In particular, between each pair of adjacent voltage levels selected among the $2^{N-1}$ first voltage levels of the multilevel data signal, one of the $(2^{N-1}-1) \times 2$ voltage levels of the multilevel clock signal is set. Further, between each pair of adjacent voltage levels selected among the $2^{N-1}$ second voltage levels of the multilevel data signal, one of the $(2^{N-1}-1) \times 2$ voltage levels of the multilevel clock signal is set. In addition, an average of the voltage levels of the multilevel clock signal for a predetermined time has a value between a minimum of the $2^{N-1}$ first voltage levels of the multilevel data signal, and a maximum of the $2^{N-1}$ second voltage levels of the multilevel data signal. Each cycle of the multilevel clock signal includes a first time interval with the first voltage level, and a second time interval with the second voltage level, and a voltage difference between the voltage level of the multilevel clock signal and the reference voltage level in the first time interval is equal to a voltage difference between the reference voltage level and the voltage level of the multilevel clock signal in the second time interval. Therefore, the average of the voltage levels of the multilevel clock signal is equal to the reference voltage level. The amplitude of the multilevel clock signal in each cycle is defined by the voltage difference between the voltage level of the multilevel clock signal and the reference voltage level in the first or second time interval. Alternatively, the voltage level of the multilevel clock signal in each cycle (including the first voltage level in the first time interval, and the second voltage level in the second time interval) is given by specifying the amplitude of the multilevel clock signal in that cycle. Thus, the threshold voltage control circuit 103 generates (N−1) bit parallel data indicative of one of the $(2^{N-1}-1)$ amplitudes of the multilevel clock signal, and sends it to the multilevel driver circuit 104. The multilevel driver circuit 104 generates the multilevel clock signal as explained above, based on the original clock signal and the (N−1) bit parallel data indicative of the amplitude of the multilevel clock signal.

The multilevel driver circuit 102 transmits the multilevel data signal to the multilevel signal receiving apparatus 200 through the transmission line 301. Similarly, the multilevel driver circuit 104 transmits the multilevel clock signal to the multilevel signal receiving apparatus 200 through the transmission line 302.

The multilevel signal receiving apparatus 200 is provided with a threshold voltage detector circuit 201, a first multilevel receiver circuit 202, a second multilevel receiver circuit 203, and a data processing circuit 204. In addition, the multilevel signal receiving apparatus 200 has a power supply VDD2 and ground GND2. The multilevel data signal received from the multilevel signal transmitting apparatus 100 is inputted into the multilevel receiver circuit 202, and the multilevel clock signal received from the multilevel signal transmitting apparatus 100 is inputted into the threshold voltage detector circuit 201 and the multilevel receiver circuit 203.

From the received multilevel clock signal, the threshold voltage detector circuit 201 detects the $(2^{N-1}-1)\times 2$ voltage levels of the multilevel clock signal, and an average of the voltage levels of the multilevel clock signal, and send the $(2^{N-1}-1)\times 2$ voltage levels and their average to the multilevel receiver circuit 202 as $2^{N}-1$ threshold voltages. The threshold voltage detector circuit 201 continues to receive the multilevel clock signal for a number of cycles, until it obtains all the $(2^{N-1}-1)\times 2$ voltage levels of the multilevel clock signal. The threshold voltage detector circuit 201 stores the obtained voltage levels in its internal memory (not shown).

The multilevel receiver circuit 202 determines, based on the $2^{N}-1$ threshold voltages sent from the threshold voltage detector circuit 201, which of the $2^{N}$ voltage levels is indicated by the received multilevel data signal, generates Nbit parallel data from the multilevel data signal, and sends it to the data processing circuit 204. The multilevel receiver circuit 203 recovers and outputs an original clock signal from the received multilevel clock signal, for synchronization with the multilevel signal transmitting apparatus 100. The data processing circuit 204 operates based on the recovered original clock signal, and generates and outputs an output data signal from the Nbit parallel data corresponding to the multilevel data signal.

Figure 2:
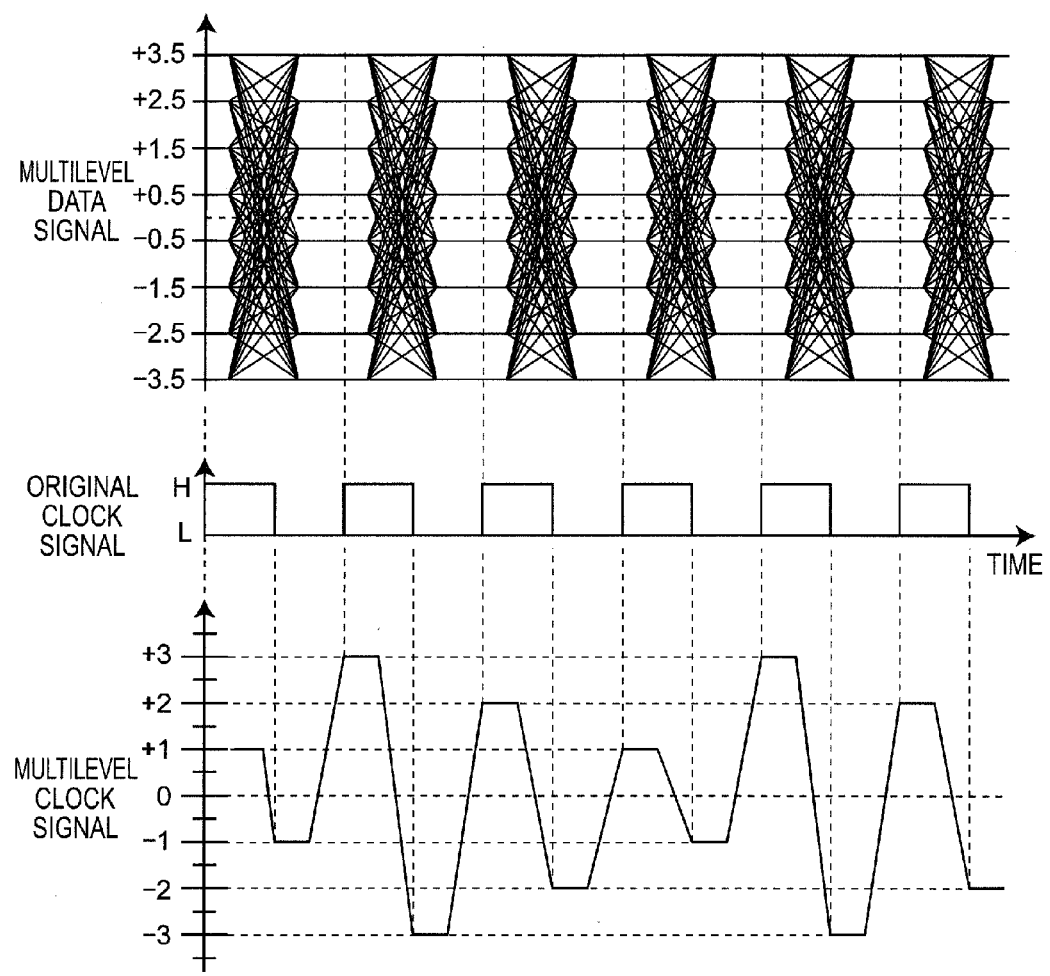
FIG. 2 is a waveform diagram showing a multilevel data signal and a multilevel clock signal each transmitted in the multilevel signal transmission system of FIG. 1, and showing an original clock signal used in the multilevel signal transmission system.

FIG. 2 is a waveform diagram showing a multilevel data signal and a multilevel clock signal each transmitted in the multilevel signal transmission system of FIG. 1, and showing an original clock signal used in the multilevel signal transmission system. FIG. 2 and the other waveform diagrams show 0[V] as the reference voltage level for explanation. The waveform diagram of FIG. 2 shows an example of the multilevel data signal with the voltage levels expressed in N=3 bits.

The multilevel data signal has $2^3$ voltage levels, i.e., +3.5, +2.5, +1.5, +0.5, −0.5, −1.5, −2.5, and −3.5 [V]. The multilevel clock signal has $(2^{3-1}-1)\times 2$ voltage levels, i.e., +3, +2, +1, −1, −2, and −3 [V]. In order to maintain DC balance, a data series of the voltage levels of the multilevel clock signal is symmetrically changed with respect to the reference voltage level, 0[V], (i.e., alternatively changed at the same amplitude), that is, "+3"→"−3"→"+2"→"−2"→"+1"→"−1"→"+3"→"−3"→ . . . .

In the multilevel signal receiving apparatus 200, the multilevel receiver circuit 203 recovers and outputs the original clock signal from the received multilevel clock signal, for synchronization with the multilevel signal transmitting apparatus 100. Simultaneously, the threshold voltage detector circuit 201 generate $2^3-1$ threshold voltages from the received multilevel clock signal. As mentioned above, $(2^{3-1}-1)\times 2=6$ threshold voltages are generated by detecting the voltage levels of the received multilevel clock signal (+3, +2, +1, −1, −2, −3), and one remaining threshold voltage is generated by detecting the average of the voltage levels of the multilevel clock signal. Since the DC balance of the multilevel clock signal is guaranteed as mentioned above, the average of the voltage levels is equal to the reference voltage level. Based on the total $2^3-1$ threshold voltages (+3, +2, +1, 0, −1, −2, −3) generated in this manner, the multilevel receiver circuit 202 determines which of $2^3$ voltage level (+3.5, +2.5, +1.5, +0.5, −0.5, −1.5, −2.5, −3.5) is indicated by the multilevel data signal.

According to the multilevel signal transmission system of this embodiment, even when attenuation occurs in the transmission lines 301 and 302, since equal attenuations occur in the multilevel data signal and in the multilevel clock signal, it is possible to correctly determine the voltage levels of the multilevel data signal, by using the threshold voltages generated from the multilevel clock signal.

According to the multilevel signal transmission system as described above, it is assumed to use the multilevel data signal with the $2^N$ voltage levels advantageous to easy data processing, and use the multilevel clock signal with the $(2^{N-1}-1)\times 2$ voltage levels. However, the multilevel signal transmission system is not limited thereto, and it is possible to implement any multilevel signal transmission system using a multilevel data signal with a number M of voltage levels, and a multilevel clock signal with a number (M−2) of voltage levels, where M is an even number equal to or more than four.

According to the multilevel signal transmission system as described above, the threshold voltage detector circuit 201 detects the average of the voltage levels of the received multilevel clock signal, and uses the average as one threshold voltage. In this case, by maintaining DC balance of the multilevel clock signal, it is possible to reduce a distortion in waveform, and stabilize the multilevel clock signal so that the average of the voltage levels of the multilevel clock signal is equal to the reference voltage level. Alternatively, the threshold voltage detector circuit 201 may use the voltage level of the ground GND2 of the multilevel signal receiving apparatus 200, instead of the average of the voltage levels of the multilevel clock signal.

As described above, according to the multilevel signal transmission system of this embodiment, when the multilevel signal receiving apparatus 200 determines the voltage level of the multilevel data signal, the multilevel signal receiving apparatus 200 generates and use the threshold voltages from the multilevel clock signal generated by the multilevel signal transmitting apparatus 100. Thus, the multilevel signal transmission system is not affected by a difference between the threshold voltages used by the transmitting apparatus and the threshold voltages used by the receiving apparatus, and by a difference between the ground voltage of the transmitting apparatus and the ground voltage of the receiving apparatus, and in addition, it is possible to accurately follow variations in the voltage levels arose from a temperature change, a device variation, attenuation in a transmission line, etc., it is possible to accurately determine the plurality of voltage levels of the multilevel data signal, and surely transmit the multilevel data signal.

Second Embodiment

Figure 3:
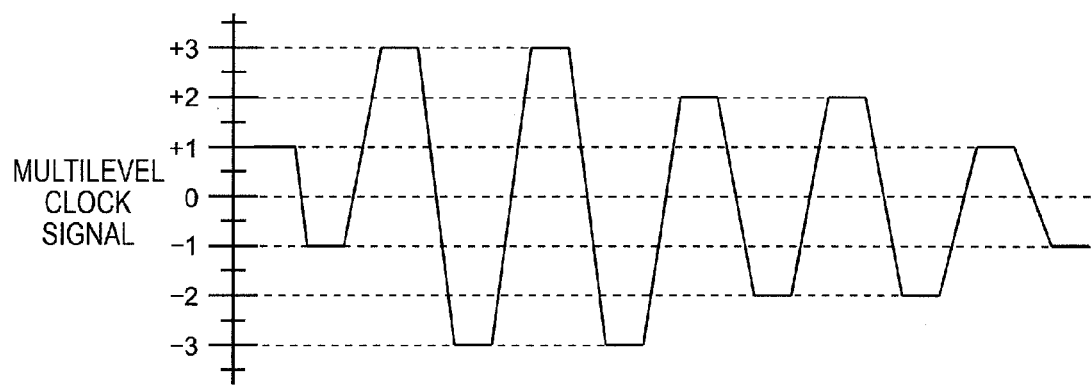
FIG. 3 is a waveform diagram showing a multilevel clock signal transmitted in a multilevel signal transmission system according to a second embodiment.

FIG. 3 is a waveform diagram showing a multilevel clock signal transmitted in a multilevel signal transmission system according to a second embodiment. The multilevel signal transmission system of 2nd embodiment is configured in a manner similar to that of the multilevel signal transmission system of FIG. 1. Referring to FIG. 3, the multilevel clock signal is generated with a constant amplitude for a predetermined number of cycles (in FIG. 3, two cycles). In the case of FIG. 3, a data series of the multilevel clock signal is as follows: "+3"→"-3"→"+3"→"-3"→"+2"→"-2"→"+2"→"-2"→ "+1"→"-1"→"+1"→"-1"→"+3"→"-3"→ .... Thus, according to the multilevel signal transmission system of this embodiment, it becomes easy to generate the threshold voltages from the voltage levels of the multilevel clock signal.

Third Embodiment

Figure 4:
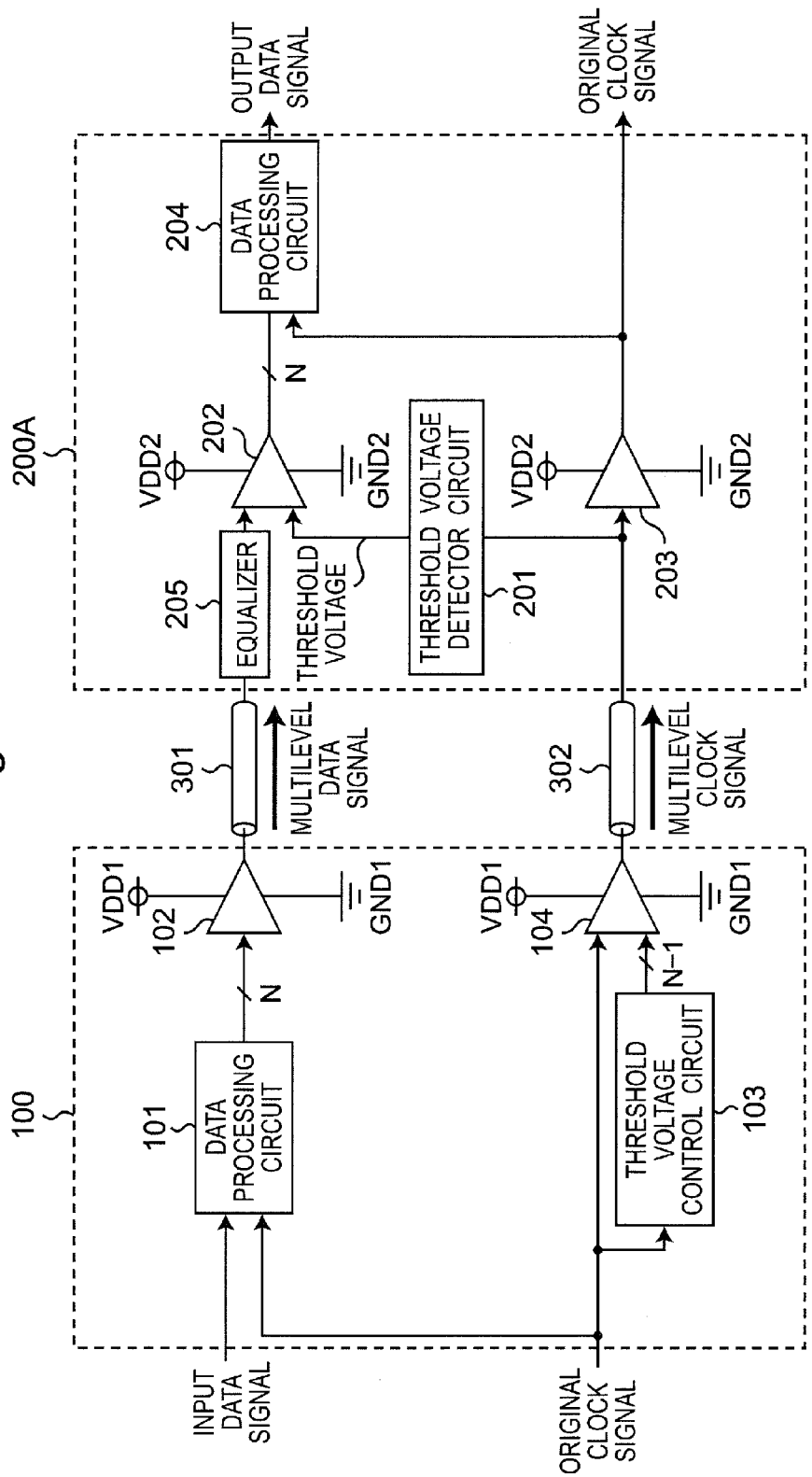
FIG. 4 is a block diagram showing a configuration of a multilevel signal transmission system according to a third embodiment.

FIG. 4 is a block diagram showing a configuration of a multilevel signal transmission system according to a third embodiment. A multilevel signal receiving apparatus 200A of FIG. 4 is configured in a manner similar to that of FIG. 1, and further provided with an equalizer 205 configured to equalize the received multilevel data signal, in front of the multilevel receiver circuit 202. In order to compensate the difference in attenuation of the multilevel data signal depending on a frequency, the equalizer 205 uses a predetermined training signal transmitted from the multilevel signal transmitting apparatus 100, and equalizes the multilevel data signal based on the bit error rate of the training signal, etc. The multilevel signal transmission system of FIG. 4 can more accurately determine the plurality of voltage levels of the multilevel data signal by using the equalizer 205.

Fourth Embodiment

Figure 5:
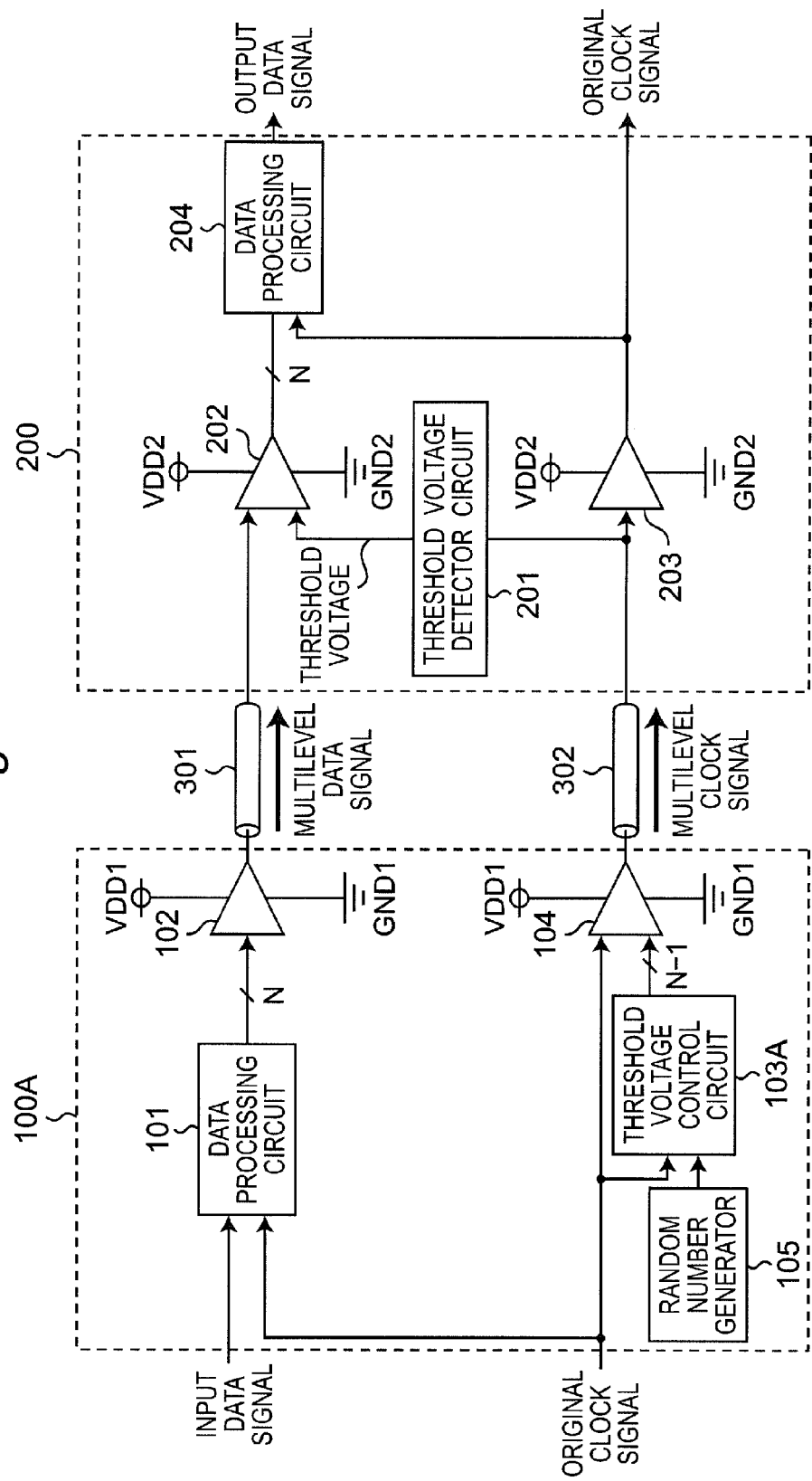
FIG. 5 is a block diagram showing a configuration of a multilevel signal transmission system according to a fourth embodiment.
Figure 6:
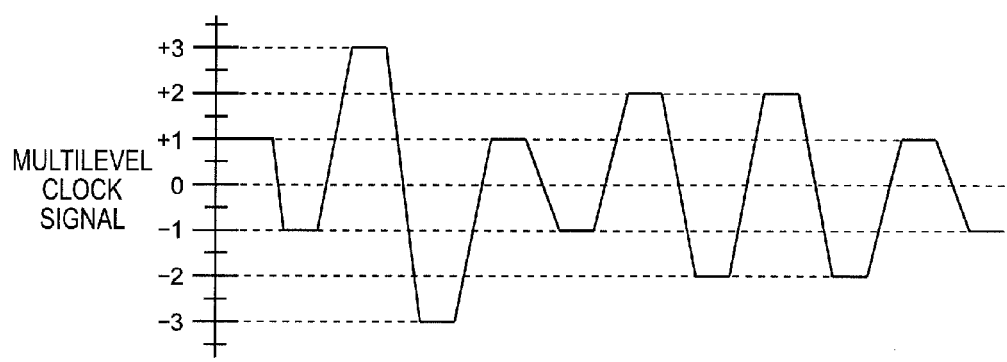
FIG. 6 is a waveform diagram showing a multilevel clock signal transmitted in the multilevel signal transmission system of FIG. 5.

FIG. 5 is a block diagram showing a configuration of a multilevel signal transmission system according to a fourth embodiment. FIG. 6 is a waveform diagram showing a multilevel clock signal transmitted in the multilevel signal transmission system of FIG. 5. A multilevel signal transmitting apparatus 100A of FIG. 5 is configured in a manner similar to that of FIG. 1, and further provided with a random number generator 105 configured to generate random numbers. A threshold voltage control circuit 105A operates based on the random number generated by the random number generator 105, and controls the multilevel driver circuit 104 to generate the multilevel clock signal with an amplitude randomly changing for every cycle. Thus, according to the multilevel signal transmission system of this embodiment, the spectrum of the multilevel clock signal is spread, and therefore, it is possible to reduce a radiated noise.

Fifth Embodiment

Figure 7:
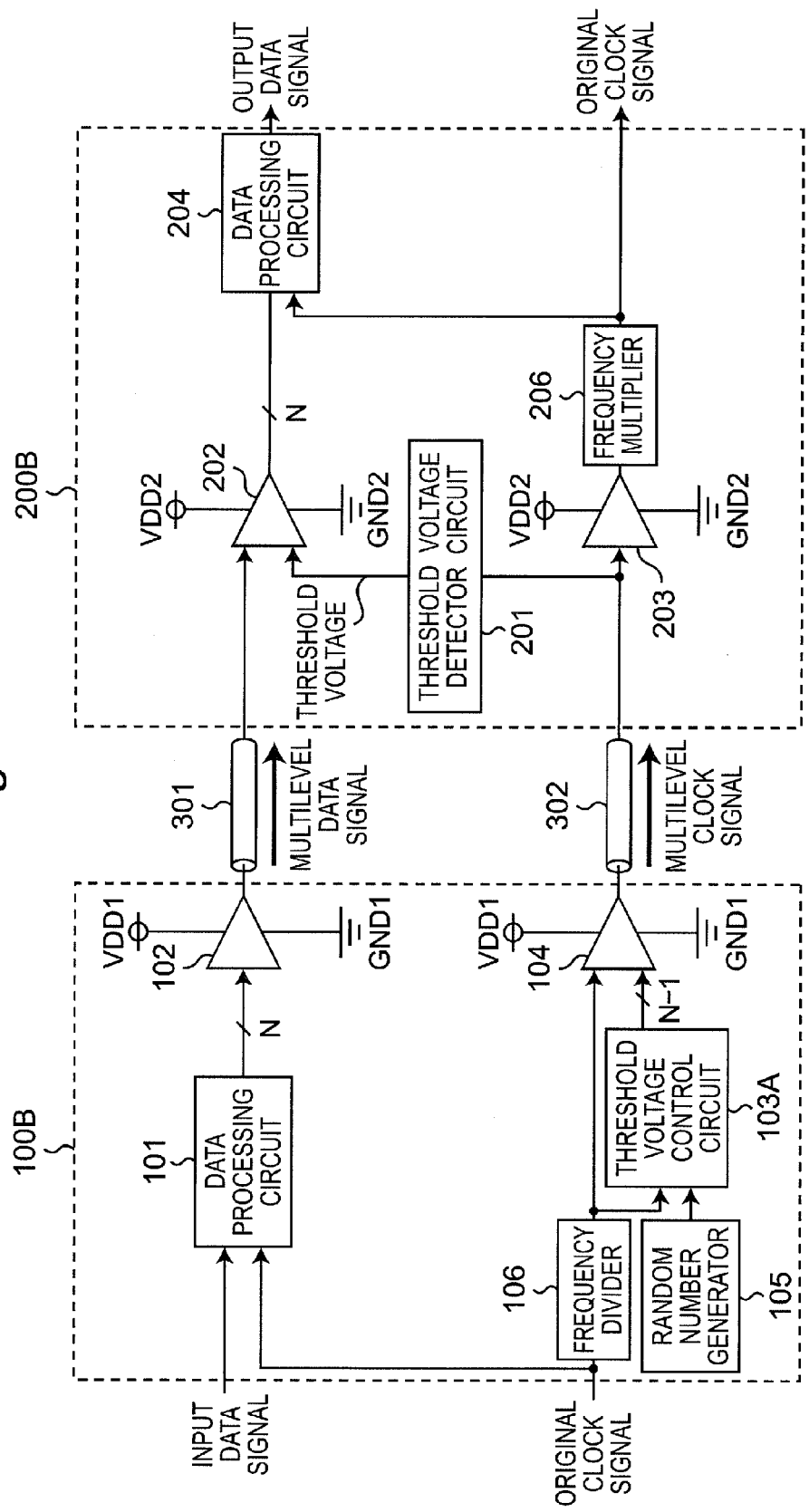
FIG. 7 is a block diagram showing a configuration of a multilevel signal transmission system according to a fifth embodiment.
Figure 8:
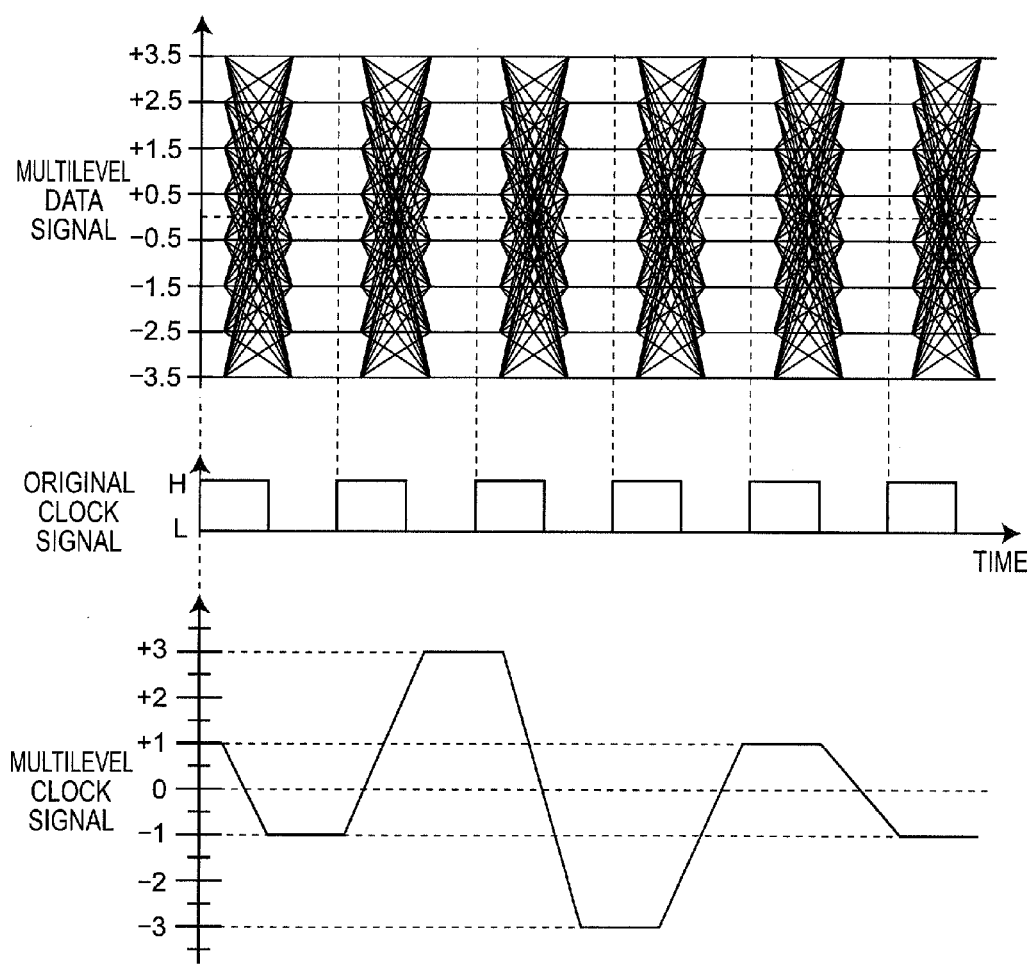
FIG. 8 is a waveform diagram showing a multilevel data signal and a multilevel clock signal each transmitted in the multilevel signal transmission system of FIG. 7, and showing an original clock signal used in the multilevel signal transmission system.

FIG. 7 is a block diagram showing a configuration of a multilevel signal transmission system according to a fifth embodiment. FIG. 8 is a waveform diagram showing a multilevel data signal and a multilevel clock signal each transmitted in the multilevel signal transmission system of FIG. 7, and showing an original clock signal used in the multilevel signal transmission system. A multilevel signal transmitting apparatus 100B of FIG. 7 is configured in a manner similar to that of FIG. 5, and further provided with a frequency divider 106 configured to divide a frequency of the original clock signal, and send a clock signal with the divided frequency to the threshold voltage control circuit 103A and to the multilevel driver circuit 104. A multilevel signal receiving apparatus 200B of FIG. 7 is configured in a manner similar to that of FIG. 1, and further provided with a frequency multiplier 206 configured to multiply a frequency of a recovered clock signal and output as an original clock signal with the frequency f [Hz]. In the multilevel signal transmitting apparatus 100B, the data processing circuit 101 and the multilevel driver circuit 102 generate the multilevel data signal based on the original clock signal, and the multilevel driver circuit 104 generates the multilevel clock signal based on the clock signal with the divided frequency of the original clock signal. As shown in FIG. 8, in the multilevel signal transmission system of FIG. 7, the frequency of the multilevel clock signal is divided and decreased. Although the waveform of the received multilevel clock signal may be degraded in the case of the multilevel clock signal with a high frequency, it is possible to prevent the degradation of the waveform by dividing of the frequency of the multilevel clock signal. Thus, according to the multilevel signal transmission system of this embodiment, it is possible to more easily generate the threshold voltages from the voltage levels of the multilevel clock signal, and reduce a radiated noise and power consumption by decreasing a frequency spectrum.

Sixth Embodiment

Figure 9:
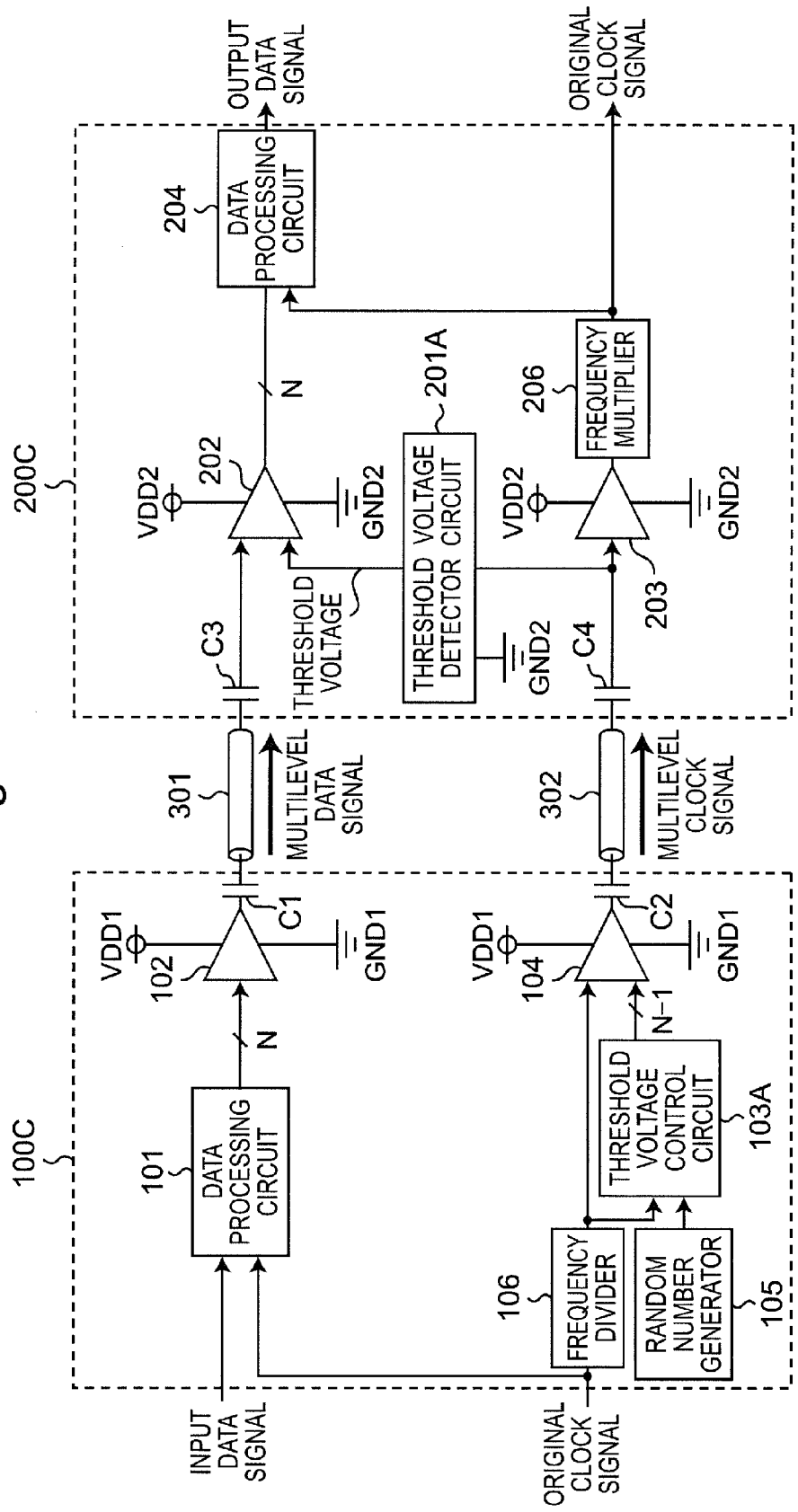
FIG. 9 is a block diagram showing a configuration of a multilevel signal transmission system according to a sixth embodiment.
Figure 10:
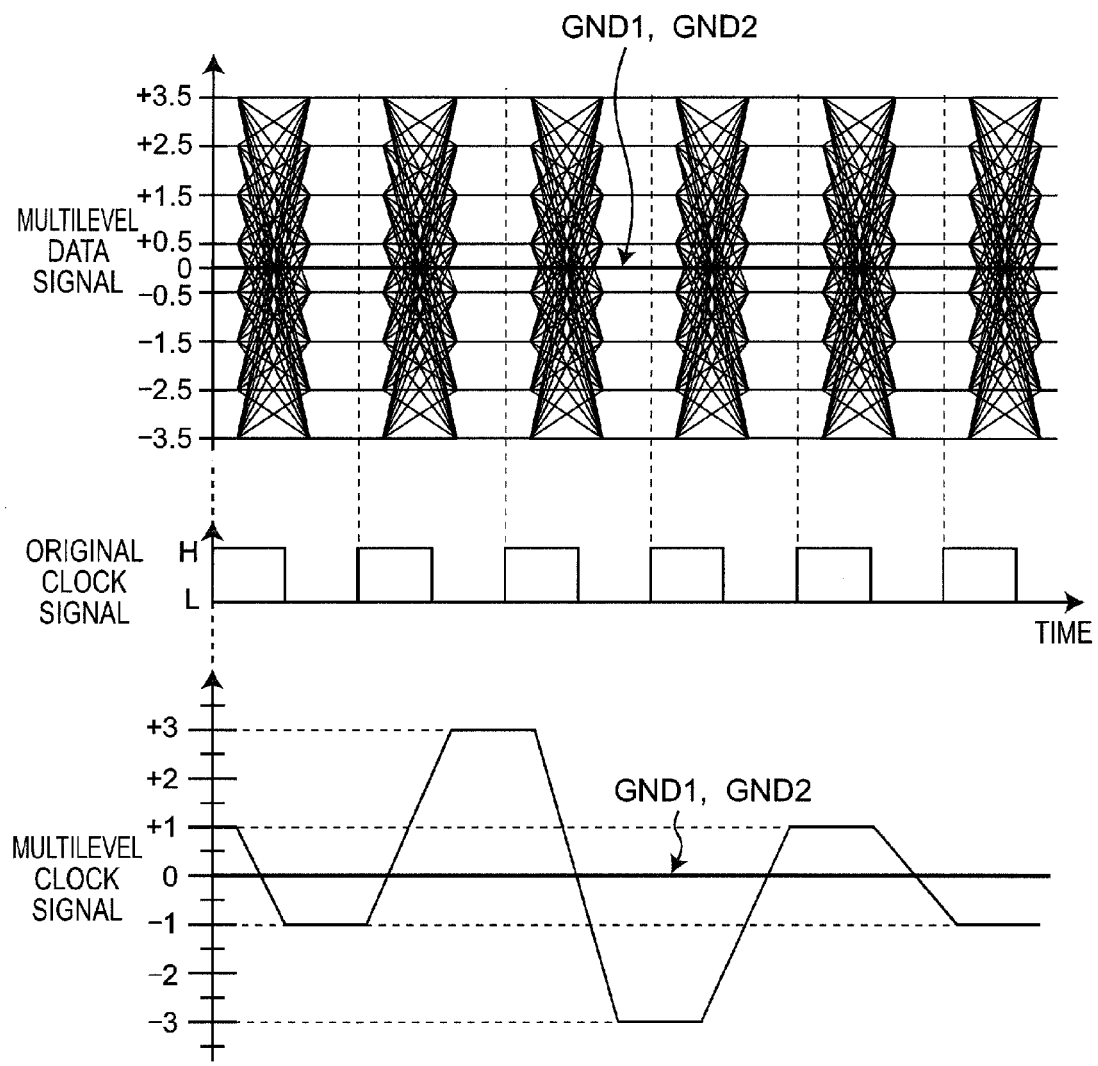
FIG. 10 is a waveform diagram showing a multilevel data signal and a multilevel clock signal each transmitted in the multilevel signal transmission system of FIG. 9, and showing an original clock signal used in the multilevel signal transmission system.

FIG. 9 is a block diagram showing a configuration of a multilevel signal transmission system according to a sixth embodiment. FIG. 10 is a waveform diagram showing a multilevel data signal and a multilevel clock signal each transmitted in the multilevel signal transmission system of FIG. 9, and showing an original clock signal used in the multilevel signal transmission system. A multilevel signal transmitting apparatus 100C of FIG. 9 is configured in a manner similar to that of FIG. 7, and further provided with a capacitor C1 connecting an output terminal of the multilevel driver circuit 102 to the transmission line 301, and a capacitor C2 connecting an output terminal of the multilevel driver circuit 104 to the transmission line 302. A multilevel signal receiving apparatus 200C of FIG. 9 is configured in a manner similar to that of FIG. 7, and further provided with a capacitor C3 connecting an input terminal of the multilevel receiver circuit 202 to the transmission line 301, and a capacitor C4 connecting an input terminal of the multilevel receiver circuit 203 to the transmission line 302. Through the capacitors C1 to C4, the multilevel driver circuits 102, 104 and the multilevel receiver circuits 202, 203 are connected to the transmission lines 301, 302 by AC coupling. According to the multilevel signal transmission system of FIG. 9, the threshold voltage detector circuit 201A may use the voltage level of the ground GND2 of the multilevel signal receiving apparatus 200C, instead of the average of the voltage levels of the received multilevel clock signal. Referring to FIG. 10, for both the multilevel data signal and the multilevel clock signal, the reference voltage level of the plurality of voltage levels is equal to the voltage levels of the grounds GND1 and GND2. In addition, according to the multilevel signal transmission system of FIG. 9, the reference voltage level is set to 0V. The capacitors C1 to C4 may be provided at at least one of the multilevel signal transmitting apparatus 100C and the multilevel signal receiving apparatus 200C. Thus, according to the multilevel signal transmission system of this embodiment, since the reference voltage level at the center of the plurality of voltage levels can be floated, the stable voltage levels of the grounds GND1 and GND2 can be used as the reference voltage level, it is possible to accurately and easily determine the reference voltage level.

Seventh Embodiment

Figure 11:
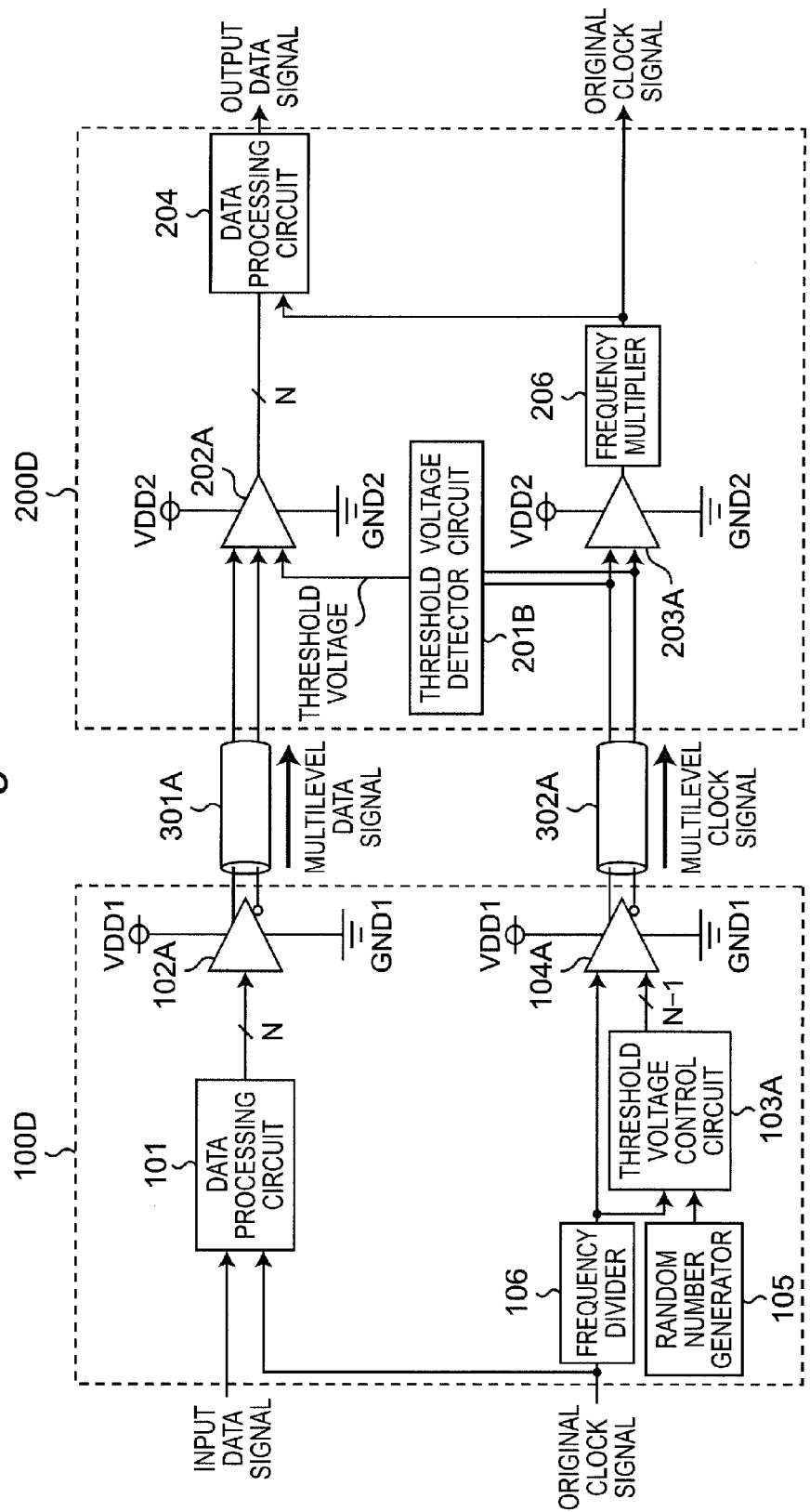
FIG. 11 is a block diagram showing a configuration of a multilevel signal transmission system according to a seventh embodiment.
Figure 12:
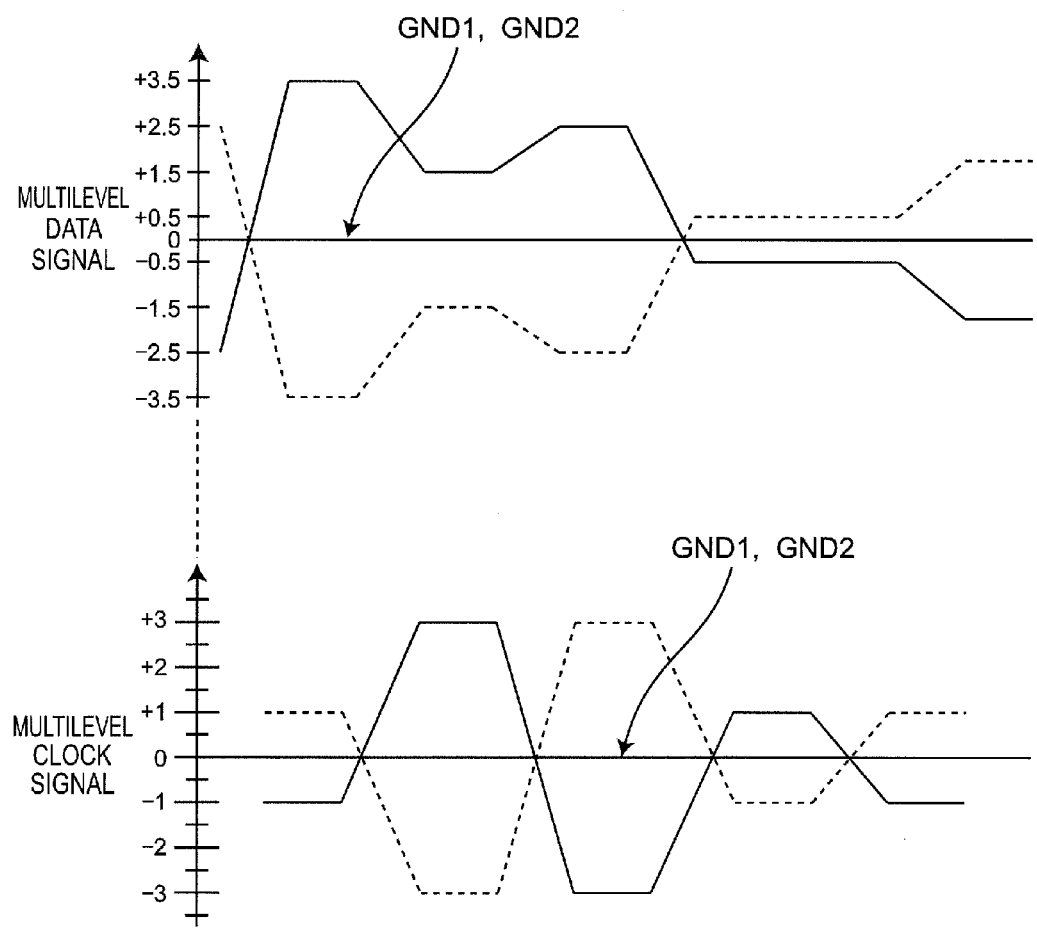
FIG. 12 is a waveform diagram showing a multilevel data signal and a multilevel clock signal each transmitted in the multilevel signal transmission system of FIG. 11, and showing an original clock signal used in the multilevel signal transmission system.

FIG. 11 is a block diagram showing a configuration of a multilevel signal transmission system according to a seventh embodiment. FIG. 12 is a waveform diagram showing a multilevel data signal and a multilevel clock signal each transmitted in the multilevel signal transmission system of FIG. 11, and showing an original clock signal used in the multilevel signal transmission system. A multilevel signal transmitting apparatus 100D of FIG. 11 is provided with multilevel driver circuits 102A and 104A as differential driver circuits, instead of the single-end multilevel driver circuits 102 and 104 of FIG. 7. A multilevel signal receiving apparatus 200D of FIG. 11 is provided with multilevel receiver circuits 202A and 203A as differential receiver circuits, instead of the single-end multilevel receiver circuits 202 and 203 of FIG. 7. Further, transmission lines 301A and 302A as differential transmission lines are provided, instead of the transmission lines 301 and 302 of FIG. 7. The multilevel signal transmitting apparatus 100D transmits a multilevel data signal and a multilevel clock signal, which are differential signals, to the multilevel signal receiving apparatus 200D through the transmission lines 301A and 302A, respectively. The threshold voltage detector circuit 201B generates $2^N-1$ threshold voltages from the received multilevel clock signal as the differential signal. According to the multilevel signal transmission system of FIG. 11, the threshold voltage detector circuit 201B can generate a reference voltage level from the received multilevel clock signal as the differential signal using the difference principle, instead of detecting the average of the voltage levels of the received multilevel clock signal. Referring to FIG. 12, for both the multilevel data signal and the multilevel clock signal, the reference voltage level of an intersection of each pair of differential signals is equal to the voltage levels of grounds GND1 and GND2. In addition, according to the multilevel signal transmission system of FIG. 11, the reference voltage level is set to 0V. Thus, according to the multilevel signal transmission system of this embodiment, since it is possible to achieve improved receiving sensitivity, higher speed, reduced noise, and improved noise resistance, and the reference voltage level is equal to the voltage levels of the grounds GND1 and GND2, it is possible to accurately and easily determine the reference voltage level.

As described above, the multilevel signal transmitting apparatus, the multilevel signal receiving apparatus, the multilevel signal transmission system, and the multilevel signal transmission method of the aspects of the present disclosure are configured as follows.

According to a multilevel signal transmitting apparatus according to a first aspect of the present disclosure, a multilevel signal transmitting apparatus is provided with: a first driver circuit configured to generate a multilevel data signal with a number M of voltage levels, and a second driver circuit configured to generate a multilevel clock signal with a number (M−2) of voltage levels, where M is an even number equal to or more than four. The number M of voltage levels of the multilevel data signal include a number M/2 of first voltage levels larger than a predetermined reference voltage level, and a number M/2 of second voltage levels smaller than the reference voltage level. Between each pair of adjacent voltage levels selected among the number M/2 of first voltage levels of the multilevel data signal, one of the number (M−2) of voltage levels of the multilevel clock signal is set. Between each pair of adjacent voltage levels selected among the number M/2 of second voltage levels of the multilevel data signal, one of the number (M−2) of voltage levels of the multilevel clock signal is set. An average of the voltage levels of the multilevel clock signal for a predetermined time has a value between a minimum of the number M/2 of first voltage levels of the multilevel data signal, and a maximum of the number M/2 of second voltage levels of the multilevel data signal.

According to a multilevel signal transmitting apparatus according to a second aspect, the multilevel signal transmitting apparatus according to the first aspect is further configured as follows. Each cycle of the multilevel clock signal includes a first time interval with the first voltage level, and a second time interval with the second voltage level. A voltage difference between the voltage level of the multilevel clock signal and the reference voltage level in the first time interval is equal to a voltage difference between the reference voltage level and the voltage level of the multilevel clock signal in the second time interval. The multilevel clock signal has an amplitude equal to the voltage difference.

According to a multilevel signal transmitting apparatus according to a third aspect, the multilevel signal transmitting apparatus according to the first or second aspect is further configured as follows. The multilevel clock signal has a constant amplitude for a predetermined number of cycles.

According to a multilevel signal transmitting apparatus according to a fourth aspect, the multilevel signal transmitting apparatus according to one of the first to third aspects is further configured as follows. An amplitude of the multilevel clock signal randomly changes for every cycle.

According to a multilevel signal transmitting apparatus according to a fifth aspect, the multilevel signal transmitting apparatus according to one of the first to fourth aspects is further configured as follows. The first driver circuit is configured to generate the multilevel data signal based on an original clock signal. The second driver circuit is configured to generate the multilevel clock signal based on a clock signal with a divided frequency of the original clock signal.

According to a multilevel signal transmitting apparatus according to a sixth aspect, the multilevel signal transmitting apparatus according to one of the first to fifth aspects is further configured as follows. An output terminal of the first driver circuit is connected to a first transmission line by AC coupling. An output terminal of the second driver circuit is connected to a second transmission lines by AC coupling.

According to a multilevel signal transmitting apparatus according to a seventh aspect, the multilevel signal transmitting apparatus according to one of the first to sixth aspects is further configured as follows. The first and second driver circuits are differential driver circuits, respectively.

According to a multilevel signal transmitting apparatus according to an eighth aspect, the multilevel signal transmitting apparatus according to one of the first to seventh aspects is further configured as follows. The number M is a power of two.

According to a multilevel signal receiving apparatus according to a ninth aspects, a multilevel signal receiving apparatus is provided with: a first receiver circuit configured to receive a multilevel data signal with a number M of voltage levels, and a second receiver circuit configured to receive a multilevel clock signal with a number (M−2) of voltage levels, where M is an even number equal to or more than four. The number M of voltage levels of the multilevel data signal include a number M/2 of first voltage levels larger than a predetermined reference voltage level, and a number M/2 of second voltage levels smaller than the reference voltage level. Between each pair of adjacent voltage levels selected among the number M/2 of first voltage levels of the multilevel data signal, one of the number (M−2) of voltage levels of the multilevel clock signal is set. Between each pair of adjacent voltage levels selected among the number M/2 of second voltage levels of the multilevel data signal, one of the number (M−2) of voltage levels of the multilevel clock signal is set. An average of the voltage levels of the multilevel clock signal for a predetermined time has a value between a minimum of the number M/2 of first voltage levels of the multilevel data signal, and a maximum of the number M/2 of second voltage levels of the multilevel data signal. The multilevel signal receiving apparatus further comprises a threshold voltage detector circuit configured to detect the number (M−2) of voltage levels of the multilevel clock signal and an average of the voltage levels of the multilevel clock signal, as a number (M−1) of threshold voltages, from the received multilevel clock signal. The first receiver circuit configured to determine, based on the number (M−1) of threshold voltages, which of the number M of voltage levels is indicated by the received multilevel data signal.

According to a multilevel signal receiving apparatus according to a tenth aspect, the multilevel signal receiving apparatus according to the ninth aspects is further provided with an equalizer configured to equalize the multilevel data signal in front of the first receiver circuit.

According to a multilevel signal receiving apparatus according to an eleventh aspect, the multilevel signal receiving apparatus according to the ninth or tenth aspects is further configured as follows. An input terminal of the first receiver circuit is connected to a first transmission line by AC coupling. An input terminal of the second receiver circuit is connected to a second transmission lines by AC coupling.

According to a multilevel signal receiving apparatus according to a twelfth aspect, the multilevel signal receiving apparatus according to one of the ninth to eleventh aspects is further configured as follows. The first and second receiver circuits are differential receiver circuits, respectively.

According to a multilevel signal receiving apparatus according to a thirteenth aspect, the multilevel signal receiving apparatus according to one of the ninth to twelfth aspects is further configured as follows. The number M is a power of two.

According to a multilevel signal transmission system according to a fourteenth aspect, the multilevel signal transmission system is provided with the multilevel signal transmitting apparatus according to one of the first to sixth aspects, and the multilevel signal receiving apparatus according to one of the ninth to eleventh aspects. The multilevel signal transmitting apparatus and the multilevel signal transmitting apparatus are connected through a first transmission line configured to transmit the multilevel data signal, and a second transmission line configured to transmit the multilevel clock signal.

According to a multilevel signal transmission system according to a fifteenth aspect, the multilevel signal transmission system is provided with the multilevel signal transmitting apparatus according to the seventh aspect, and the multilevel signal receiving apparatus according to the twelfth aspect. The multilevel signal transmitting apparatus and the multilevel signal transmitting apparatus are connected through a first transmission line configured to transmit the multilevel data signal, and a second transmission line configured to transmit the multilevel clock signal.

According to a multilevel signal transmission system according to a sixteenth aspect, the multilevel signal transmission system is provided with the multilevel signal transmitting apparatus according to the eighth aspect, and the multilevel signal receiving apparatus according to the thirteenth aspect. The multilevel signal transmitting apparatus and the multilevel signal transmitting apparatus are connected through a first transmission line configured to transmit the multilevel data signal, and a second transmission line configured to transmit the multilevel clock signal.

According to a multilevel signal transmission method according to a seventeenth aspect, a multilevel signal transmission method is provided for transmitting a multilevel data signal with a number M of voltage levels, and a multilevel clock signal with a number (M−2) of voltage levels, from a multilevel signal transmitting apparatus to a multilevel signal receiving apparatus, where M is an even number equal to or more than four. The number M of voltage levels of the multilevel data signal include a number M/2 of first voltage levels larger than a predetermined reference voltage level, and a number M/2 of second voltage levels smaller than the reference voltage level. Between each pair of adjacent voltage levels selected among the number M/2 of first voltage levels of the multilevel data signal, one of the number (M−2) of voltage levels of the multilevel clock signal is set. Between each pair of adjacent voltage levels selected among the number M/2 of second voltage levels of the multilevel data signal, one of the number (M−2) of voltage levels of the multilevel clock signal is set. An average of the voltage levels of the multilevel clock signal for a predetermined time has a value between a minimum of the number M/2 of first voltage levels of the multilevel data signal, and a maximum of the number M/2 of second voltage levels of the multilevel data signal. The multilevel signal transmission method includes: generating the multilevel data signal and the multilevel clock signal by the multilevel signal transmitting apparatus, receiving the multilevel data signal and the multilevel clock signal by the multilevel signal receiving apparatus, detecting, by the multilevel signal receiving apparatus, the number (M−2) of voltage levels of the multilevel clock signal and an average of the voltage levels of the multilevel clock signal, as a number (M−1) of threshold voltages, from the received multilevel clock signal, and determining, by the multilevel signal receiving apparatus, based on the number (M−1) of threshold voltages, which of the number M of voltage levels is indicated by the received multilevel data signal.

According to the multilevel signal transmitting apparatus, the multilevel signal receiving apparatus, the multilevel signal transmission system, and the multilevel signal transmission method of the aspects of the present disclosure, they are not affected by a difference between the threshold voltages used by the transmitting apparatus and the threshold voltages used by the receiving apparatus, and by a difference between a ground voltage of the transmitting apparatus and a ground voltage of the receiving apparatus, and in addition, it is possible to accurately follow variations in the voltage levels arose from a temperature change, a device variation, attenuation in a transmission line, etc. Therefore, it is not necessary to extract the threshold voltages from the states of the multilevel data signal including rapid variations, and it is possible to more surely extract the threshold voltages from the clock signal, and it is possible to accurately determine the plurality of voltage levels of the multilevel data signal, and surely transmit the multilevel data signal.

In addition, according to the multilevel signal transmitting apparatus, the multilevel signal receiving apparatus, the multilevel signal transmission system, and the multilevel signal transmission method of the aspects of the present disclosure, since the voltage levels are symmetrically changed with respect to the reference voltage level (i.e., alternatively changed at the same amplitude), it is possible to reduce a distortion in waveform, and stabilize the multilevel clock signal so that the average of the voltage levels of the multilevel clock signal is equal to the reference voltage level.

In addition, according to the multilevel signal transmitting apparatus, the multilevel signal receiving apparatus, the multilevel signal transmission system, and the multilevel signal transmission method of the aspects of the present disclosure, since the multilevel clock signal has a constant amplitude for a predetermined number of cycles, it becomes easy to generate the threshold voltages from the voltage levels of the multilevel clock signal.

In addition, according to the multilevel signal transmitting apparatus, the multilevel signal receiving apparatus, the multilevel signal transmission system, and the multilevel signal transmission method of the aspects of the present disclosure, since the amplitude of the multilevel clock signal randomly changes for every cycle, the spectrum of the multilevel clock signal is spread, and therefore, it is possible to reduce a radiated noise.

In addition, according to the multilevel signal transmitting apparatus, the multilevel signal receiving apparatus, the multilevel signal transmission system, and the multilevel signal transmission method of the aspects of the present disclosure, since the multilevel clock signal is generated based on the clock signal with the divided frequency of the original clock signal, it is possible to more easily generate the threshold voltages from the voltage levels of the multilevel clock signal, and reduce a radiated noise and power consumption by decreasing a frequency spectrum.

In addition, according to the multilevel signal transmitting apparatus, the multilevel signal receiving apparatus, the multilevel signal transmission system, and the multilevel signal transmission method of the aspects of the present disclosure, the reference voltage level at the center of the plurality of voltage levels can be floated by using AC coupling, the stable voltage levels of the grounds GND1 and GND2 can be used as the reference voltage level, it is possible to accurately and easily determine the reference voltage level (0V).

In addition, according to the multilevel signal transmitting apparatus, the multilevel signal receiving apparatus, the multilevel signal transmission system, and the multilevel signal transmission method of the aspects of the present disclosure, since the differential signals are transmitted, it is possible to achieve improved receiving sensitivity, higher speed, reduced noise, and improved noise resistance, and the reference voltage level is equal to the voltage levels of the grounds GND1 and GND2. Therefore, it is possible to accurately and easily determine the reference voltage level (0V).

As described above, according to the multilevel signal transmitting apparatus, the multilevel signal receiving apparatus, the multilevel signal transmission system, and the multilevel signal transmission method of the aspects of the present disclosure, since the plurality of voltage levels of the multilevel clock signal are used as the threshold voltages of the multilevel data signal, and the AC coupling and the differential transmission are further used, it is possible to accurately determine the plurality of voltage levels of the multilevel data signal.

The multilevel signal transmitting apparatus, the multilevel signal receiving apparatus, the multilevel signal transmission system, and the multilevel signal transmission method of the embodiments of the present disclosure can accurately determine the plurality of voltage levels of the multilevel data signal, by using the plurality of voltage levels of the multilevel clock signal as the threshold voltages of the multilevel data signal, and can be applied to increase data density to transmit a large amount of data without increasing a frequency of signal transmission.

The invention claimed is:

1. A multilevel signal transmitting apparatus comprising: a first driver circuit configured to generate a multilevel data signal with a number M of voltage levels, and a second driver circuit configured to generate a multilevel clock signal with a number (M−2) of voltage levels, where M is an even number equal to or more than four,
   wherein the number M of voltage levels of the multilevel data signal include a number M/2 of first voltage levels larger than a predetermined reference voltage level, and a number M/2 of second voltage levels smaller than the reference voltage level,
   wherein between each pair of adjacent voltage levels selected among the number M/2 of first voltage levels of the multilevel data signal, one of the number (M−2) of voltage levels of the multilevel clock signal is set,
   wherein between each pair of adjacent voltage levels selected among the number M/2 of second voltage levels of the multilevel data signal, one of the number (M−2) of voltage levels of the multilevel clock signal is set, and
   wherein an average of the voltage levels of the multilevel clock signal for a predetermined time has a value between a minimum of the number M/2 of first voltage levels of the multilevel data signal, and a maximum of the number M/2 of second voltage levels of the multilevel data signal.

2. The multilevel signal transmitting apparatus according to claim 1,
   wherein each cycle of the multilevel clock signal includes a first time interval with the first voltage level, and a second time interval with the second voltage level,
   wherein a voltage difference between the voltage level of the multilevel clock signal and the reference voltage level in the first time interval is equal to a voltage difference between the reference voltage level and the voltage level of the multilevel clock signal in the second time interval, and
   wherein the multilevel clock signal has an amplitude equal to the voltage difference.

3. The multilevel signal transmitting apparatus according to claim 1,
   wherein the multilevel clock signal has a constant amplitude for a predetermined number of cycles.

4. The multilevel signal transmitting apparatus according to claim 1,
   wherein an amplitude of the multilevel clock signal randomly changes for every cycle.

5. The multilevel signal transmitting apparatus according to claim 1,
   wherein the first driver circuit is configured to generate the multilevel data signal based on an original clock signal, and
   wherein the second driver circuit is configured to generate the multilevel clock signal based on a clock signal with a divided frequency of the original clock signal.

6. The multilevel signal transmitting apparatus according to claim 1,
wherein an output terminal of the first driver circuit is connected to a first transmission line by AC coupling, and
wherein an output terminal of the second driver circuit is connected to a second transmission lines by AC coupling.

7. The multilevel signal transmitting apparatus according to claim 1,
wherein the first and second driver circuits are differential driver circuits, respectively.

8. The multilevel signal transmitting apparatus according to claim 1,
wherein the number M is a power of two.

9. A multilevel signal receiving apparatus comprising: a first receiver circuit configured to receive a multilevel data signal with a number M of voltage levels, and a second receiver circuit configured to receive a multilevel clock signal with a number (M−2) of voltage levels, where M is an even number equal to or more than four,
wherein the number M of voltage levels of the multilevel data signal include a number M/2 of first voltage levels larger than a predetermined reference voltage level, and a number M/2 of second voltage levels smaller than the reference voltage level,
wherein between each pair of adjacent voltage levels selected among the number M/2 of first voltage levels of the multilevel data signal, one of the number (M−2) of voltage levels of the multilevel clock signal is set,
wherein between each pair of adjacent voltage levels selected among the number M/2 of second voltage levels of the multilevel data signal, one of the number (M−2) of voltage levels of the multilevel clock signal is set,
wherein an average of the voltage levels of the multilevel clock signal for a predetermined time has a value between a minimum of the number M/2 of first voltage levels of the multilevel data signal, and a maximum of the number M/2 of second voltage levels of the multilevel data signal,
wherein the multilevel signal receiving apparatus further comprises a threshold voltage detector circuit configured to detect the number (M−2) of voltage levels of the multilevel clock signal and an average of the voltage levels of the multilevel clock signal, as a number (M−1) of threshold voltages, from the received multilevel clock signal, and
wherein the first receiver circuit configured to determine, based on the number (M−1) of threshold voltages, which of the number M of voltage levels is indicated by the received multilevel data signal.

10. The multilevel signal receiving apparatus according to claim 9, further comprising an equalizer configured to equalize the multilevel data signal in front of the first receiver circuit.

11. The multilevel signal receiving apparatus according to claim 9,
wherein an input terminal of the first receiver circuit is connected to a first transmission line by AC coupling, and
wherein an input terminal of the second receiver circuit is connected to a second transmission lines by AC coupling.

12. The multilevel signal receiving apparatus according to claim 9,
wherein the first and second receiver circuits are differential receiver circuits, respectively.

13. The multilevel signal receiving apparatus according to claim 9,
wherein the number M is a power of two.

14. A multilevel signal transmission system comprising: a multilevel signal transmitting apparatus and a multilevel signal receiving apparatus,
wherein the multilevel signal transmitting apparatus comprises: a first driver circuit configured to generate a multilevel data signal with a number M of voltage levels, and a second driver circuit configured to generate a multilevel clock signal with a number (M−2) of voltage levels, where M is an even number equal to or more than four,
wherein the number M of voltage levels of the multilevel data signal include a number M/2 of first voltage levels larger than a predetermined reference voltage level, and a number M/2 of second voltage levels smaller than the reference voltage level,
wherein between each pair of adjacent voltage levels selected among the number M/2 of first voltage levels of the multilevel data signal, one of the number (M−2) of voltage levels of the multilevel clock signal is set,
wherein between each pair of adjacent voltage levels selected among the number M/2 of second voltage levels of the multilevel data signal, one of the number (M−2) of voltage levels of the multilevel clock signal is set,
wherein an average of the voltage levels of the multilevel clock signal for a predetermined time has a value between a minimum of the number M/2 of first voltage levels of the multilevel data signal, and a maximum of the number M/2 of second voltage levels of the multilevel data signal,
wherein the multilevel signal receiving apparatus comprising: a first receiver circuit configured to receive the multilevel data signal, and a second receiver circuit configured to receive the multilevel clock signal,
wherein the multilevel signal receiving apparatus further comprises a threshold voltage detector circuit configured to detect the number (M−2) of voltage levels of the multilevel clock signal and an average of the voltage levels of the multilevel clock signal, as a number (M−1) of threshold voltages, from the received multilevel clock signal,
wherein the first receiver circuit configured to determine, based on the number (M−1) of threshold voltages, which of the number M of voltage levels is indicated by the received multilevel data signal, and
wherein the multilevel signal transmitting apparatus and the multilevel signal transmitting apparatus are connected through a first transmission line configured to transmit the multilevel data signal, and a second transmission line configured to transmit the multilevel clock signal.

15. The multilevel signal transmission system according to claim 14,
wherein the first and second driver circuits are differential driver circuits, respectively, and
wherein the first and second receiver circuits are differential receiver circuits, respectively.

16. The multilevel signal transmission system according to claim 14,
wherein the number M is a power of two.

17. A multilevel signal transmission method for transmitting a multilevel data signal with a number M of voltage levels, and a multilevel clock signal with a number (M−2) of voltage levels, from a multilevel signal transmitting apparatus to a multilevel signal receiving apparatus, where M is an even number equal to or more than four, wherein the number M of voltage levels of the multilevel data signal include a number M/2 of first voltage levels larger than a predetermined reference voltage level, and a number M/2 of second voltage levels smaller than the reference voltage level, wherein between each pair of adjacent voltage levels selected among the number M/2 of first voltage levels of the multilevel data signal, one of the number (M−2) of voltage levels of the multilevel clock signal is set, wherein between each pair of adjacent voltage levels selected among the number M/2 of second voltage levels of the multilevel data signal, one of the number (M−2) of voltage levels of the multilevel clock signal is set, wherein an average of the voltage levels of the multilevel clock signal for a predetermined time has a value between a minimum of the number M/2 of first voltage levels of the multilevel data signal, and a maximum of the number M/2 of second voltage levels of the multilevel data signal, wherein the multilevel signal transmission method including:

generating the multilevel data signal and the multilevel clock signal by the multilevel signal transmitting apparatus, receiving the multilevel data signal and the multilevel clock signal by the multilevel signal receiving apparatus, detecting, by the multilevel signal receiving apparatus, the number (M−2) of voltage levels of the multilevel clock signal and an average of the voltage levels of the multilevel clock signal, as a number (M−1) of threshold voltages, from the received multilevel clock signal, and determining, by the multilevel signal receiving apparatus, based on the number (M−1) of threshold voltages, which of the number M of voltage levels is indicated by the received multilevel data signal.

* * * * *